(12) United States Patent
Jantke et al.

(10) Patent No.: US 12,577,154 B2
(45) Date of Patent: Mar. 17, 2026

(54) HYDROPHOBIC MINERAL INSULATING MATERIALS

(71) Applicant: WACKER CHEMIE AG, Munich (DE)

(72) Inventors: Dominik Jantke, Burghausen (DE); Robert Schroeck, Altoetting (DE)

(73) Assignee: WACKER CHEMIE AG, Munich (DE)

( * ) Notice: Subject to any disclaimer, the term of this patent is extended or adjusted under 35 U.S.C. 154(b) by 597 days.

(21) Appl. No.: 17/783,705

(22) PCT Filed: Dec. 11, 2019

(86) PCT No.: PCT/EP2019/084712
§ 371 (c)(1),
(2) Date: Jun. 9, 2022

(87) PCT Pub. No.: WO2021/115593
PCT Pub. Date: Jun. 17, 2021

(65) Prior Publication Data
US 2023/0002275 A1 Jan. 5, 2023

(51) Int. Cl.
| | |
|---|---|
| *C03C 25/40* | (2006.01) |
| *C03C 13/06* | (2006.01) |
| *C08G 77/00* | (2006.01) |
| *C08G 77/26* | (2006.01) |

(52) U.S. Cl.
CPC .............. *C03C 25/40* (2013.01); *C03C 13/06* (2013.01); *C08G 77/26* (2013.01); *C03C 2213/00* (2013.01); *C08G 77/70* (2013.01)

(58) Field of Classification Search
None
See application file for complete search history.

(56) References Cited

U.S. PATENT DOCUMENTS

| | | | |
|---|---|---|---|
| 3,890,269 A | 6/1975 | Martin | |
| 7,129,369 B2 | 10/2006 | Heller et al. | |
| 2011/0046294 A1* | 2/2011 | Minge ..................... | C08L 53/00 |
| | | | 977/773 |
| 2012/0285643 A1* | 11/2012 | Yu ............................ | E04C 2/16 |
| | | | 162/164.4 |
| 2012/0286189 A1 | 11/2012 | Barthel et al. | |
| 2012/0319029 A1 | 12/2012 | Jaffrennou et al. | |
| 2020/0172436 A1 | 6/2020 | Azevedo et al. | |
| 2020/0361818 A1 | 11/2020 | D'Herin Bytner et al. | |

FOREIGN PATENT DOCUMENTS

| | | | |
|---|---|---|---|
| CN | 104402211 B | 1/2017 | |
| DE | 2339761 C2 | 9/1982 | |
| DE | 102009054566 A1 | 11/2010 | |
| DE | 2019204353 A1 | 10/2019 | |
| EP | 1580215 B1 | 10/2006 | |
| WO | WO0183394 | * 11/2001 | |
| WO | 2014044900 A1 | 3/2014 | |
| WO | 2019025672 A1 | 2/2019 | |
| WO | 2019025706 A1 | 2/2019 | |
| WO | 2019043078 A1 | 3/2019 | |
| WO | 2019204353 A1 | 10/2019 | |

OTHER PUBLICATIONS

Wacker, Silres 1340 Safety Data sheet, 2018 (Year: 2018).*

* cited by examiner

*Primary Examiner* — Shawn Mckinnon
(74) *Attorney, Agent, or Firm* — Brooks Kushman P.C.

(57) ABSTRACT

Hydrophobic mineral insulation materials and method of making the same are disclosed. The mineral insulants may include at least one amino-functional organosilicon compound. The amino-functional organosilicon compounds may have an amine number in the range of 0.05 to 0.40. The method of hydrophobicizing may include providing an aqueous emulsion having at least one amino-functional organosilicon compound which may have an amine in the range of 0.05 to 0.40.

14 Claims, No Drawings

HYDROPHOBIC MINERAL INSULATING MATERIALS

CROSS REFERENCE TO RELATED APPLICATIONS

This application is the U.S. National Phase of PCT Appln. No. PCT/EP2019/084712 filed Dec. 11, 2019, the disclosure of which is incorporated in its entirety by reference herein.

BACKGROUND OF THE INVENTION

1. Field of the Invention

The invention relates to hydrophobic mineral insulants comprising at least one aminofunctional organosilicon compound having an amine number in the range from 0.05 to 0.40 and also to a method for producing them and to the use of amino-functional organosilicon compounds having an amine number in the range from 0.05 to 0.40 for hydrophobicizing mineral insulants.

2. Description of the Related Art

DE102009054566A1 for example reports on the need for mineral insulants and the advantages.

An example of a typical mineral insulant is mineral wool. Mineral wool is produced from melt fiberization and processes for this are well known, as exemplified by WO2019/025706. The binder/binders, the hydrophobicizing component, the dust-binder, and any further components are sprayed onto the still hot fibers from so-called spinners, in general, directly after the fiber-foil ling step.

Mineral wool, when freshly produced, is inherently hydrophilic. This is the case particularly when no phenol-formaldehyde resin-based binders are used. The use of "green binders" based on organic renewable raw materials such as starch (e.g. WO2019/025672A1, Saint-Gobain). In another example, the shunning of binder for the "blowing wool" (e.g. WO2014/044900A1, Acoustic Scandinavia) or blown-in insulation is used. These are major trends in the industry, owing to the significantly more sustainable mode of operation.

Mineral wool before being used as insulating material is generally given a hydrophobic treatment. This may be implemented, for example, by reactive or nonreactive organosilicon compounds, generally polydimethylsiloxanes or silicone resins. CN104402211A describes the use of SILRES® BS 1042, an aqueous emulsion of a polydimethylsiloxane. WO2019/043078A1 describes the use of SILRES® BS 45, a solvent-free silicone resin emulsion.

The organosilicon compounds used, however, have little interaction with the mineral fibers. In order to achieve a uniform covering, therefore, the hydrophobicizing agent must be applied directly after the fiber production process, especially if the fiber is very hot, in order to break the emulsion and to distribute the silicone as uniformly as possible over the fiber. The amount added, moreover, must be chosen to be relatively high.

SUMMARY OF THE INVENTION

Surprisingly it has now been found that the use of amino-functional organosilicon compounds having an amine number in the range from 0.05 to 0.40, especially in the form of emulsions, for hydrophobicizing mineral insulants solves these problems in the prior art. Accordingly, by using such emulsions, a very effective and uniform distribution of the hydrophobicizing component on the mineral fibers is achieved and additionally a long-lasting hydrophobization is obtained on account of the high interaction. There is, moreover, a rapid covering of the surface, and there is no need for "breaking" of the emulsion by rapid evaporation of the solvent. Mineral insulants can therefore be treated both at high temperatures and at relatively low temperature.

This allows the hydrophobicizing also to be carried out independently of the process of producing the mineral insulants. An optional possibility, moreover, is to do without the use of an adhesion promotor.

DETAILED DESCRIPTION

One subject of the invention are hydrophobic mineral insulants comprising at least one amino-functional organosilicon compound having an amine number in the range from 0.05 to 0.40.

Mineral insulants are those both of natural origin and of synthetic origin. Examples are expanded clay, calcium silicates such as vermiculite, mineral foam, perlites, foamed glass, mineral wools such as rockwool and glass wool. For insulation these materials are used customarily in the form of fibers, pellets, mats, sheets or other shaped parts.

The mineral wool insulants include, for example, synthetic glass fibers, glass fibers, ceramic fibers, basalt fibers, rock fibers, etc.

The mineral wool insulants may take any desired form, such as sheets and mats, for example, or the form of a binder-free variant referred to as "blowing wool" for blown-in insulation.

A preferred mineral insulant used is mineral wool, and more preferably the mineral insulant used is glass wool, rockwool or "blowing wool".

The mineral insulants may comprise binders or may be free of binders; the presence of binder has no influence on the technical effect of the invention. Typical binders, for glass wool or rockwool, for example, are phenol-formaldehyde, melamine formaldehyde, or carbohydrate-based binders (based on starch, for example). Additionally, the mineral insulants may optionally comprise further components such as dust-binders, in the form of mineral oil emulsions, for example, or adhesion promoters, such as silanes having amino side chains or silanes having glycidyloxy side chains or silanes having ureido side chains, for example.

The amino-functional organosilicon compound must have an amine number in the range from 0.05 to 0.40. The amine number is preferably in a range from 0.10 to 0.20.

The amine number is understood by definition to be the amount of potassium hydroxide (KOH) in mg which is equated with the amine fraction of 1 g of substance. It may be determined for example by potentiometric titration or titration against bromophenol blue, as described in DIN 53176. In the case of mixtures of amino-functional organosilicon compounds, accordingly, a mean amine number is obtained for the mixture.

The amino-functional organosilicon compound may be an oligomeric or polymeric organosilicon compound, and may be linear or branched. The amino groups may be distributed randomly in the molecule or may be arranged terminally. There may be further reactive groups, such as hydrolysable groups (e.g., alkoxy groups), for example.

The amino-functional organosilicon compound is preferably at least one compound of the formula (I)

$$(SiO_{4/2})_a(R^1SiO_{3/2})_b(R^2SiO_{3/2})_{b'}(R^1{}_2SiO_{2/2})_c$$
$$(R^1R^2SiO_{2/2})_{c'}(R^2{}_2SiO_{2/2})_{c''}(R^1{}_3SiO_{1/2})_d)$$
$$R^1{}_2R^2SiO_{1/2})_{d'}(R^1R^2{}_2SiO_{1/2})_{d''}(R^2{}_3SiO_{1/2})_{d'''} \quad (I),$$

in which the indices a, b, c, c', c", d, d', d" and d''' indicate the number of the respective siloxane unit in the compound and independently of one another are an integer in the range from 0 to 100,000, with the proviso that the sum of a, b, b', c, c', c", d, d', d", d''' together adopts a value of at least 2, and at least one of the indices b', c', c", d', d" or d''' is other than 0; and in which the radicals $R^1$ independently of one another are a $C_1$-$C_{18}$ hydrocarbon radical which is unsubstituted or substituted by at least one fluorine, chlorine or bromine atom or by a $C_1$-$C_5$ alkoxy group, and in which the radicals $R^2$ are a group of the general formula (II)

$$—R—[NR'(CH_2)_n]_aN(R')_2 \quad (II),$$

in which the index n adopts the values 2, 3, 4, 5 or 6, the index a adopts the values 0, 1, 2, 3 or 4, the radical R is a divalent, linear, unbranched or branched $C_1$-$C_{18}$-hydrocarbon radical, the radicals R' independently of one another are selected from the group consisting of (i) hydrogen, (ii) $C_1$-$C_{18}$ hydrocarbon radical which is unsubstituted or substituted by at least one fluorine, chlorine or bromine atom or by a hydroxyl group or by a $C_1$-$C_5$ alkoxy group, or (iii) acyl radical which is unsubstituted or substituted by at least one fluorine, chlorine or bromine atom or by a hydroxyl group or by a $C_1$-$C_5$ 25 alkoxy group.

With particular preference an amino-functional organosilicon compound as follows is used: in formula (I) the radicals $R^1$ independently of one another are a $C_1$-$C_6$ alkyl radical, more particularly a methyl radical; and in formula (II) the index a adopts a value of 1, the index n adopts a value of 2, the radicals R' are hydrogen, and the radical R is a divalent $C_1$-$C_6$ hydrocarbon radical, more particularly a propylene radical.

Amino-functional organosilicon compounds per se are known and may be produced in ways including those described in EP1580215 or DE2339761, such as by reaction of silanol-terminated silanes or polydimethylsiloxanes with amino-functional silanes, for example.

Amino-functional organosilicon compounds are also available commercially, as silicone oils, for example, or in the form of emulsions. Amino-functional organosilicon compounds having an amine number in the range from 0.05 to 0.40 are available commercially as emulsions, such as SILRES® BS 1340, from Wacker Chemie AG.

A further subject of the invention is the use of amino-functional organosilicon compounds having an amine number in the range from 0.05 to 0.40 for hydrophobicizing mineral insulants.

The mineral insulants are preferably selected from expanded clay, calcium silicates such as vermiculite, mineral foam, perlites, foamed glass, mineral wools such as rockwool and glass wool. Mineral insulants are hydrophobicized using preferably the amino-functional organosilicon compound in the form of aqueous emulsions.

A further subject is a method for producing the hydrophobic mineral insulants, comprising the steps of:
a) providing an aqueous emulsion comprising at least one amino-functional organosilicon compound having an amine number in the range from 0.05 to 0.40, b) contacting a mineral insulant with the emulsion of (a), and
c) drying.

The providing of an emulsion encompasses not only the production of such an emulsion but also the use of commercially available emulsions. Commercially available emulsions may be used unchanged, but they can also be diluted or the pH can be changed.

Emulsions comprising at least one amino-functional organosilicon compound having an amine number in the range from 0.05 to 0.40 are based customarily on the following components:
(A) at least one amino-functional organosilicon compound having an amine number in the range from 0.05 to 0.40,
(B) water,
(C) optionally further constituents, such as, for example, emulsifiers, acids, biocides, thickeners, film formers, preservatives, silanes.

Preferred emulsions are based customarily on the following components:
(A) at least one amino-functional organosilicon compound having an amine number in the range from 0.05 to 0.40,
(B) at least one emulsifier, e.g. at least one nonionic, anionic, cationic or amphoteric emulsifier, and
(C) water,
(D) at least one organic or inorganic acid,
(E) optionally further constituents, such as, for example, biocides, thickeners, film formers, preservatives, silanes.

Emulsifiers used may be all anionic, nonionic, cationic or amphoteric emulsifiers known to date, and also individual emulsifiers and mixtures of different emulsifiers, with which it has also been possible hitherto to produce aqueous emulsions of organopolysiloxanes.

Examples of Anionic Emulsifiers are:
1. Alkyl sulfates, particularly those having a chain length of 8 to 18 carbon atoms, alkyl and alkaryl ether sulfates having 8 to 18 carbon atoms in the hydrophobic radical and 1 to 40 ethylene oxide (EO) and/or propylene oxide (PO) units.
2. Sulfonates, particularly alkylsulfonates having 8 to 18 carbon atoms, alkylarylsulfonates having 8 to 18 carbon atoms, taurides, esters and monoesters of sulfosuccinic acid with monohydric alcohols or alkylphenols having 4 to 15 carbon atoms; these alcohols or alkylphenols may also optionally be ethoxylated with 1 to 40 EO units.
3. Alkali metal salts and ammonium salts of carboxylic acids having 8 to 20 carbon atoms in the alkyl, aryl, alkaryl or aralkyl radical.
4. Phosphoric acid partial esters and their alkali metal and ammonium salts, particularly alkyl and alkaryl phosphates having 8 to 20 carbon atoms in the organic radical, alkyl ether phosphates and alkaryl ether phosphates having 8 to 20 carbon atoms in the alkyl or alkaryl radical and 1 to 40 EU units.

Examples of Nonionic Emulsifiers are:
5. Polyvinyl alcohol additionally having 5 to 50%, preferably 8 to 20%, of vinyl acetate units, with a degree of polymerization of 500 to 3000.
6. Alkyl polyglycol ethers, preferably those with 3 to 40 EO units and alkyl radicals of 8 to 20 carbon atoms.
7. Alkylaryl polyglycol ethers, preferably those with 5 to 40 EU units and 8 to 20 carbon atoms in the alkyl and aryl radicals.
8. Ethylene oxide/propylene oxide (EO/PO) block copolymers, preferably those having 8 to 40 EO and PO units.

9. Adducts of alkylamines having alkyl radicals of 8 to 22 carbon atoms with ethylene oxide or propylene oxide.

10. Fatty acids having 6 to 24 carbon atoms.

11. Alkylpolyglycosides of the general formula R"—O—$Z_O$, in which R" is a linear or branched, saturated or unsaturated alkyl radical having on average 8-24 carbon atoms and $Z_{O\ is\ an}$ oligoglycoside radical having on average o=1-10 hexose or pentose units or mixtures thereof.

12. Natural substances and derivatives thereof, such as lecithin, lanolin, saponins, cellulose; cellulose alkyl ethers and carboxyalkylcelluloses whose alkyl groups in each case possess up to 4 carbon atoms.

13. Linear organo(poly)siloxanes containing polar groups, including in particular the elements O, N, C, S, P, Si, more particularly those siloxanes having alkoxy groups with up to 24 carbon atoms and/or up to 40 Et) and/or PO groups. Examples of Cationic Emulsifiers are:

14. Salts of primary, secondary and tertiary fatty amines having 8 to 24 carbon atoms with acetic acid, sulfuric acid, hydrochloric acid and phosphoric acids.

15. Quaternary alkylammonium and alkylbenzeneammonium salts, more particularly those whose alkyl groups possess 6 to 24 carbon atoms, more particularly the halides, sulfates, phosphates and acetates.

16. Alkylpyridinium, alkylimidazolinium and alkyloxazolinium salts, more particularly those whose alkyl chain possesses up to 18 carbon atoms, especially the halides, sulfates, phosphates and acetates.
Particularly Suitable Amphoteric Emulsifiers are as Follows:

17. Amino acids with long-chain substitution, such as N-alkyl-di(aminoethyl)glycine or N-alkyl-2-aminopropionic acid salts.

18. Betaines, such as N-(3-acylamidopropyl)-N,N-dimethylammonium salts having a $C_8$-$C_{18}$ acyl radical, and alkylimidazolium betaines or quaternized alkyl or substituted alkyl derivatives of N,N-dimethylglycine.

Preferred emulsifiers are nonionic emulsifiers, more particularly the polyvinyl alcohols or alkyl polyglycol ethers listed above under 5. and 6.

The emulsifier may consist of one of the above-stated emulsifiers or of a mixture of two or more of these emulsifiers, and may be used in pure form or as solutions of one or more emulsifiers in water or organic solvents.

The emulsifier may be used preferably in amounts in a range from 0.1 to 60 wt %, more preferably in a range from 0.5 to 30 wt %, based in each case on the total weight of amino-functional organosilicon compounds.

The emulsions may be produced by all common standard processes.

Silanes used may be all of the silanes familiar to a skilled artisan as adhesion promoters. These may be, in particular, silanes having amino side chains or silanes having glycidyloxy side chains or silanes having ureido side chains.

The contacting may be accomplished by all of the common techniques known to the skilled person, such as, for example, by spraying, dipping, spread-coating, pour coating, etc. Contacting is accomplished preferably by spraying or dipping. Contacting may take place once or multiple times, in which case the same emulsion or else a different emulsion may be used.

The drying may take place by all of the common techniques known to the skilled person, such as, for example, air drying, infrared, contact drying, or more particularly air circulation drying.

The pH of the emulsion is customarily in a range of 3-9, the pH being situated preferably in the slightly acidic range of 4-6.

The active content of the emulsion used is not essential. The active content of commercially available emulsions is customarily in a range from 20 wt % to 70 wt %. Prior to the contacting, the emulsion may also be diluted with water and/or with the above-stated components such as, for example, binders, dust-binders or other components. The emulsion when contacted ought to have an active content of at least 0.01 wt %, preferably 0.1 wt %.

The mineral insulant may be present in any desired form, for example, as binder-free mineral wool ("blowing wool"), as binder-containing fibers, as mats, as sheets or as other shaped articles.

The amino-functional organosilicon compound is preferably at least one compound of the general formula (I)

$$(SiO_{4/2})_a(R^1SiO_{3/2})_b(R^2SiO_{3/2})_{b'}(R^1_2SiO_{2/2})_c$$
$$(R^1R^2SiO_{2/2})_{c'}(R^2_2SiO_{2/2})_{c''}(R^1_3SiO_{1/2})_d)$$
$$R^1_2R^2SiO_{1/2})_{d'}(R^1R^2_2SiO_{1/2})_{d''}(R^2_3SiO_{1/2})_{d'''} \qquad (I),$$

in which the indices a, b, b', c, c', c", d, d', d" and d''' indicate the number of the respective siloxane unit in the compound and independently of one another are an integer in the range from 0 to 100,000, with the proviso that the sum of a, b, b', c, c', c", d, d', d", d''' together adopts a value of at least 2, and at least one of the indices b", c', c", d', d" or d''' is other than 0; and in which the radicals $R^1$ independently of one another are a $C_1$-$C_{18}$ hydrocarbon radical which is unsubstituted or substituted by at least one fluorine, chlorine, or bromine atom or by a $C_1$-$C_5$ alkoxy group, and in which the radicals $R^2$ are a group of the general formula (II)

$$—R—[NR'(CH_2)_n]_aN(R')_2 \qquad (II),$$

in which the index n adopts the values 2, 3, 4, 5, or 6, the index a adopts the values 0, 1, 2, 3, or 4, the radical R is a divalent, linear, unbranched or branched $C_1$-$C_{18}$-hydrocarbon radical, the radicals independently of one another are selected from the group consisting of (i) hydrogen, (ii) $C_1$-$C_{18}$ hydrocarbon radical which is unsubstituted or substituted by at least one fluorine, chlorine or bromine atom or by a hydroxyl group or by a $C_1$-$C_5$ alkoxy group, or (iii) CI-Cis acyl radical which is unsubstituted or substituted by at least one fluorine, chlorine or bromine atom or by a hydroxyl group or by a $C_1$-$C_5$ alkoxy group.

Through the choice of the amine number in a range from 0.05 to 0.40 there is little discoloration of the mineral insulants, or none, even under (moderate) thermal load. Because of the use of amino-functional organosilicon compounds it is possible and optional to exclude an additional adhesion promoter. A possibility, arising with the method of the invention, moreover, is that of after treating mineral wool which has already been produced.

EXAMPLES

The emulsions used in the inventive and comparative examples are commercially available products from WACKER Chemie AG:

SILRES® BS 1042: aqueous emulsion of an OH-terminated, reactive polydimethylsiloxane, active content 60 wt %.

SILRES® BS 1052: aqueous emulsion of a trimethylsilylterminated, nonreactive polydimethylsiloxane, active content 60 wt %.

SILRES® BS 1340 (pH 7): aqueous emulsion of an amino-functional polydimethylsiloxane, active content 60 wt %.

SILRES® BS 1340 (pH 5): aqueous emulsion of an amino-functional polydimethylsiloxane, active content 60 wt %. For the examples, the pH was adjusted to 5 using acetic acid.

Measuring the Contact Angle

The contact angle was measured using a KRÜSS DSA 30 instrument. To measure the contact angle, 8 drops of water were placed onto each specimen and the contact angle was determined.

Determining the Hydrophobization of a Glass Surface

In order to simulate the rapid and uniform expression of the hydrophobicity of a glass surface, glass slides (Thermo Scientific, Menzel Gläser Superforst®, ground 45°) were immersed in dilute emulsions. Before being used, all of the emulsions were diluted with water to an active content of 2 wt %. The results are set out in table 1. The experiments are suitable for simulating the hydrophobization of mineral wool surfaces.

compound, and independent of one another are an integer in the range from 0 to 100,000, the sum of a, c, c', c'', d, d', d'', d''' is at least 2, and at least one of c', c'', d', d'' or d''' is other than 0; and radicals $R^1$, independent of one another, are each a $C_1$-$C_{18}$ hydrocarbon radical which is unsubstituted or substituted by at least one fluorine, chlorine or bromine atom or by a $C_1$-$C_5$ alkoxy group, and in which the radicals $R^2$ are a group of the general formula (II):

$$-R-[NR'(CH_2)_n]_aN(R')_2 \tag{II}$$

where n is 2, 3, 4, 5 or 6; a is 0, 1, 2, 3 or 4; R is a divalent, linear, unbranched or branched $C_1$-$C_{18}$-hydrocarbon radical, the radicals R', independent of one another, are selected from the group consisting of (i) hydrogen, (ii) a $C_1$-$C_{18}$ hydrocarbon radical which is unsubstituted or substituted by at least one fluorine, chlorine or bromine atom or by a hydroxyl group or by a $C_1$-$C_5$ alkoxy group, and (iii) a $C_1$-$C_{18}$ acyl radical which is unsub-

TABLE 1

| | Emulsion | Comments | pH | Immersion time/temp. of glass plate | Contact angle |
|---|---|---|---|---|---|
| CE1 | — | Contact angle measured on the glass plate | | | 31° |
| Inventive example 1 | SILRES ® BS 1340 | Amino-functional PDMS emulsion | 7 | 10 sec/RT | 94° |
| Inventive example 2 | SILRES ® BS 1340 | Amino-functional PDMS emulsion | 5 | 10 sec/RT | 103° |
| Inventive example 3 | SILRES ® BS 1340 | Amino-functional PDMS emulsion | 5 | 30 sec/RT | 104° |
| Inventive example 4 | SILRES ® BS 1340 | Amino-functional PDMS emulsion | 5 | 2 sec/100° C. | 103° |
| CE2 | SILRES ® BS 1042 | Emulsion with reactive PDMS | 7 | 10 sec/RT | 48° |
| CE3 | SILRES ® BS 1042 | Emulsion with reactive PDMS | 7 | 2 sec/100° C. | 60° |
| CE4 | SILRES ® BS 1052 | Emulsion with nonreactive PDMS | 7 | 10 sec/RT | 41° |

The amino-functional emulsion SILRES® BS 1340 exhibits a very rapid and strong expression of the hydrophobicity, which is particularly strongly expressed in the case of a slightly acidic pH.

The inventive examples (1-4) show a very good spreading behavior, namely a very good and rapid distribution directly on the mineral surface. The result is a very good long-term hydrophobicity by virtue of the high interaction with the mineral surface.

The invention claimed is:

1. A method for hydrophobicizing mineral insulants, the method comprising:
   a) providing an aqueous emulsion including at least one amino-functional organosilicon compound having an amine number in the range from 0.05 to 0.40, the aqueous emulsion having a pH in the range of 4 to 6;
   b) contacting a mineral insulating material with an emulsion of (a); and
   c) drying after contacting in step b) to form a mineral insulant;
   wherein the at least one amino-functional organosilicon compound includes a compound represented by formula (I):

$$(SiO_{4/2})_a(R^1SiO_{3/2})_b(R^2SiO_{3/2})_{b'}(R^1{}_2SiO_{2/2})_c$$
$$(R^1R^2SiO_{2/2})_{c'}(R^2{}_2SiO_{2/2})_{c''}(R^1{}_3SiO_{1/2})_d)$$
$$R^1{}_2R^2SiO_{1/2})_{d'}(R^1R^2{}_2SiO_{1/2})_{d''}(R^2{}_3SiO_{1/2})_{d'''} \tag{I}$$

wherein b and b' are 0, and a, c, c', c'', d, d', d'' and d''' indicate the number of the respective siloxane unit in the stituted or substituted by at least one fluorine, chlorine or bromine atom or by a hydroxyl group or by a $C_1$-$C_5$ alkoxy group.

2. The method of claim 1, wherein the concentration of the amino-functional organosilicon compound in the emulsion is at least 0.01 wt %.

3. The method of claim 1, wherein the mineral insulating material is in the form of a binder-free mineral wool, binder-containing fibers, a mat, a sheet or a shaped article.

4. The method of claim 1, wherein the mineral insulating material includes mineral wool.

5. The method of claim 1, wherein the amine number is in the range from 0.1 to 0.20.

6. A hydrophobic mineral insulant comprising:
   at least one mineral insulating material; and
   at least one amino-functional organosilicon compound of an aqueous emulsion having a pH in the range of 4 to 6, the at least one amino-functional organosilicon compound having an amine number in the range from 0.05 to 0.40 and including a compound represented by formula (I):

$$(SiO_{4/2})_a(R^1SiO_{3/2})_b(R^2SiO_{3/2})_{b'}(R^1{}_2SiO_{2/2})_c$$
$$(R^1R^2SiO_{2/2})_{c'}(R^2{}_2SiO_{2/2})_{c''}(R^1{}_3SiO_{1/2})_d)$$
$$R^1{}_2R^2SiO_{1/2})_{d'}(R^1R^2{}_2SiO_{1/2})_{d''}(R^2{}_3SiO_{1/2})_{d'''} \tag{I}$$

wherein b and b' are 0, and a, c, c', c'', d, d', d'' and d''' indicate the number of the respective siloxane unit in the compound, and independent of one another are an integer in the range from 0 to 100,000, the sum of a, c, c', c'', d, d', d'', d''' is at least 2, and at least one of c', c'', d', d'' or d''' is other than 0; and radicals $R^1$, independent of one another, are each a $C_1$-$C_{18}$ hydrocarbon radical which is unsubstituted or substituted by at least one fluorine, chlorine or bromine atom or by a $C_1$-$C_5$ alkoxy group, and in which the radicals $R^2$ are a group of the general formula (II):

$$\text{—R—}[NR'(CH_2)_n]_a N(R')_2 \qquad \text{(II)},$$

where n is 2, 3, 4, 5 or 6; a is 0, 1, 2, 3 or 4; R is a divalent, linear, unbranched or branched $C_1$-$C_{18}$-hydrocarbon radical; the radicals R', independent of one another, are selected from the group consisting of (i) hydrogen, (ii) a $C_1$-$C_{18}$ hydrocarbon radical which is unsubstituted or substituted by at least one fluorine, chlorine or bromine atom or by a hydroxyl group or by a $C_1$-$C_5$ alkoxy group, and (iii) a $C_1$-$C_{18}$ acyl radical which is unsubstituted or substituted by at least one fluorine, chlorine or bromine atom or by a hydroxyl group or by a $C_1$-$C_5$ alkoxy group.

7. The hydrophobic mineral insulant of claim 6, wherein the at least one mineral insulating material is a binder-free mineral wool.

8. The hydrophobic mineral insulant of claim 6, wherein the hydrophobic mineral insulant is binder free.

9. The hydrophobic mineral insulant of claim 6, further comprising an emulsifier.

10. The hydrophobic mineral insulant of claim 6, wherein the amine number is in the range from 0.1 to 0.20.

11. The hydrophobic mineral insulant of claim 6, wherein the radicals $R^1$ independent of one another are $C_1$-$C_6$ alkyl radicals; a is 1, n is 2, the radicals R' are hydrogen, and the radical R is a divalent $C_1$-$C_6$ hydrocarbon radical.

12. The hydrophobic mineral insulant of claim 6, wherein the radicals $R^1$ include a methyl radical.

13. The hydrophobic mineral insulant of claim 6, wherein the radicals $R^1$ are methyl radicals.

14. The hydrophobic mineral insulant of claim 6, wherein the radical R is a propylene radical.

* * * * *